US011438401B2

(12) United States Patent
Hu

(10) Patent No.: US 11,438,401 B2
(45) Date of Patent: Sep. 6, 2022

(54) SERVICE PROCESSING METHOD AND DEVICE

(71) Applicant: ADVANCED NEW TECHNOLOGIES CO., LTD., Grand Cayman (KY)

(72) Inventor: Zongwang Hu, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

(21) Appl. No.: 16/156,239

(22) Filed: Oct. 10, 2018

(65) Prior Publication Data

US 2019/0045029 A1 Feb. 7, 2019

Related U.S. Application Data

(63) Continuation of application No. PCT/CN2017/078502, filed on Mar. 29, 2017.

(30) Foreign Application Priority Data

Apr. 11, 2016 (CN) .......................... 201610219408.7

(51) Int. Cl.
G06F 9/451 (2018.01)
H04L 67/01 (2022.01)
(Continued)

(52) U.S. Cl.
CPC ........... H04L 67/01 (2022.05); G06Q 20/085 (2013.01); G06Q 20/12 (2013.01); G06Q 30/0633 (2013.01); G06F 9/451 (2018.02)

(58) Field of Classification Search
CPC ...... H04L 67/42; G06Q 20/085; G06Q 20/12; G06Q 30/0633; G06F 9/451
(Continued)

(56) References Cited

U.S. PATENT DOCUMENTS 8,032,587 B2 10/2011 Chetuparambil et al.
8,843,632 B2 9/2014 Mercuri
(Continued)

FOREIGN PATENT DOCUMENTS

CN 103020815 A * 4/2013
CN 103020815 A 4/2013
(Continued)

OTHER PUBLICATIONS

D H. Schuldt, A. Popovici and H.—. Schek, "Automatic generation of reliable e-commerce payment processes," Proceedings of the First International Conference on Web Information Systems Engineering, 2000, pp. 434-441 vol. 1, doi: 10.1109/WISE.2000.882423 (Year: 2000).*
(Continued)

Primary Examiner — Michelle T Kringen

(57) ABSTRACT

A service processing method comprises: receiving, by a first server possessing a first service function, a first service request sent by a client; generating a first service result based on the first service request; and sending the first service result to the client and a second server possessing a second service function, for the second server to directly generate a second service result based on the first service result, and after the second server receives a second service request generated by the client based on the first service result, to send the generated second service result to the client.

12 Claims, 7 Drawing Sheets

(51) Int. Cl.
*G06Q 20/12* (2012.01)
*G06Q 20/08* (2012.01)
*G06Q 30/06* (2012.01)

(58) Field of Classification Search
USPC ........................................................ 705/26.8
See application file for complete search history.

(56) References Cited

U.S. PATENT DOCUMENTS

| | | | |
|---|---|---|---|
| 8,930,457 B2 | 1/2015 | Burckart et al. | |
| 9,215,154 B2 | 12/2015 | Mercuri | |
| 9,251,327 B2 | 2/2016 | Donfried et al. | |
| 9,391,998 B2 | 7/2016 | Fletcher et al. | |
| 9,459,888 B2 | 10/2016 | Huang et al. | |
| 10,346,900 B1* | 7/2019 | Wilson | G06F 8/38 |
| 2006/0271497 A1* | 11/2006 | Cullen | G06Q 20/04 |
| | | | 705/64 |
| 2010/0229086 A1 | 9/2010 | Howell et al. | |
| 2012/0331125 A1 | 12/2012 | Li et al. | |
| 2013/0267200 A1 | 10/2013 | Weiner et al. | |
| 2014/0344123 A1 | 11/2014 | Banerjee et al. | |
| 2015/0149361 A1 | 5/2015 | Lee | |
| 2015/0154593 A1 | 6/2015 | Li et al. | |
| 2015/0310735 A1 | 10/2015 | Ke | |
| 2015/0332244 A1 | 11/2015 | Zhang et al. | |
| 2016/0275537 A1* | 9/2016 | Yamano | G06Q 30/0222 |

FOREIGN PATENT DOCUMENTS

| | | |
|---|---|---|
| CN | 104601327 A | 5/2015 |
| CN | 105024980 A | 11/2015 |
| JP | 2002-351714 A | 12/2002 |
| JP | 2012-519907 A | 8/2012 |
| TW | 201520926 A | 6/2015 |
| TW | M518370 U | 3/2016 |
| WO | 2001/022680 A2 | 3/2001 |
| WO | 2016/187149 A1 | 11/2016 |

OTHER PUBLICATIONS

First Office Action and First Search for Chinese Application No. 201610219408.7 dated Mar. 13, 2019 with machine English translation (12 pages).
Second Office Action for Chinese Application No. 201610219408.7 dated Apr. 24, 2019 with machine English translation (8 pages).
International Preliminary Report on Patentability Chapter I for PCT Application No. PCT/CN2017/078502 dated Oct. 25, 2018 (10 pages).
European Search Report for European Patent Application No. 17781797.0 dated Aug. 8, 2019 (7 pages).
Third Office Action for Chinese Application No. 201610219408.7 dated Aug. 2, 2019 with machine English translation (8 pages).
Examination Report for Indonesian Application No. PID201808081 dated Sep. 17, 2019 (4 pages).
Notice of Reasons for Refusal for Japanese Application No. 2019-503611 dated Oct. 29, 2019 with English machine translation (9 pages).
Office Action for Korean Application No. 10-2018-7032520 dated Jan. 3, 2020 (8 pages).
Taiwan Office Action and Search Report dated Oct. 9, 2018, issued in related Taiwan Application No. 106107801 (4 pages).
International Search Report and Written Opinion for Application No. PCT/CN2017/078502, dated Jun. 19, 2017, 8 pages.
Supplementary Search for Chinese Application No. 201610219408.7 dated Nov. 22, 2019 (1 page).
Fourth Office Action for Chinese Application No. 201610219408.7 dated Dec. 2, 2019 (4 pages).
Office Action for Korean Application No. 10-2018-7032520 dated Apr. 8, 2020.
Office Action for Korean Application No. 10-2018-7032520 dated Jun. 1, 2020.

* cited by examiner

SERVICE PROCESSING METHOD AND DEVICE

CROSS REFERENCE TO RELATED APPLICATIONS

The present application is a continuation application of the International Patent Application No. PCT/CN2017/078502, filed on Mar. 29, 2017, and titled "SERVICE PROCESSING METHOD AND DEVICE." The PCT Application PCT/CN2017/078502 claims priority to the Chinese Patent Application No. 201610219408.7 filed on Apr. 11, 2016. The entire contents of all of the above applications are incorporated herein by reference in their entirety.

TECHNICAL FIELD

This application relates to the field of computer technology, and in particular, to a service processing method and device.

BACKGROUND

The backend of online systems (e.g., websites) usually includes a variety of service systems, and the different service systems have different service functions. Thus, supported by these service systems, online systems can provide users with a variety of services.

Currently, in an application scenario, the service requests initiated by users through clients such as browsers or applications (APP) may require multiple service systems working in synergy to complete.

In current technologies, the processing of such service requests is as follows: according to the service flow sequence, first, the service system processing this service request will generate a corresponding processing result (also called an intermediate result) and return it to the client; based on the intermediate result, the client redirects to the next service system in the service flow and initiates a request (also called an intermediate request), for the next service system to perform follow-up processing, which continues until the entire service flow has been completed.

For example, it is assumed that a service request issued by a client requires service systems A and B for completion. According to the service flow, this service request is first processed by service system A, and intermediate result a is generated. At this time, service system A will return intermediate result a to the client. This client redirects to service system B based on intermediate result a and further issues a request to service system B. Service system B will process this request, generate service result b, and return it to the client.

However, in the current technological approach, the service systems within an online system use the Internet to interact with clients, and the Internet's network environment has poor stability. Because of network delays affected by the network environment, it may take a long time for the client to send an intermediate request to the next service system based on the intermediate service result. In addition, in this approach, a service system can only conduct corresponding processing after receiving the client's request, and online systems are usually accessed by a large number of users, creating heavy workloads for each service system, and leading to wait times for requests in service system processing queues. Delays may present in the request transmission stage and processing stage, which inevitably create long wait times for the client, resulting in poor time-effectiveness for the service processing process.

SUMMARY

The embodiments of this disclosure provide a service processing method and device, for solving the existing problem of poor time-effectiveness for the service processing process.

According to one aspect of the disclosure, a service processing method comprises: receiving, by a first server possessing a first service function, a first service request sent by a client; generating a first service result based on the first service request; and sending the first service result to the client and a second server possessing a second service function, for the second server to directly generate a second service result based on the first service result, and after the second server receives a second service request generated by the client based on the first service result, to send the generated second service result to the client.

In some embodiments, the first service request comprises an order placement request; and the first service result comprises order information. The first server comprises an order placement server, and the second server comprises a payment server.

In some embodiments, the second server is caused to receive the first service result from the first server to generate the second service result, before the second server receives the second service request from the client.

According to another aspect of the disclosure, a service processing method comprises: receiving, by a second server possessing a second service function, a first service result sent by a first server possessing a first service function, wherein the first service result is generated after processing by the first server a first service request sent by a client; and generating a second service result based on the first service result.

In some embodiments, the method further comprises: receiving, by the second server, a second service request sent by the client; and after receiving the second service request, feeding the generated second service result back to the client.

In some embodiments, the first service result comprises order information; the second service result comprises a payment page including order information; and the second service request comprises a payment request.

In some embodiments, the second server receives the first service result from the first server to generate the second service result, before the second server receives the second service request from the client.

In some embodiments, the first server comprises an order placement server, and the second server comprises a payment server.

In some embodiments, the method further comprises: rendering and building a service interface based on the second service result; and after the second server receives the second service request sent by the client, sending the rendered and built service interface to the client for display.

According to another aspect of the disclosure, a service processing device (e.g., a first server) comprises a processor and a non-transitory computer-readable storage medium storing instructions that, when executed by the processor, cause the device to perform a service processing method. The method comprises: receiving a first service request sent by a client; generating a first service result based on the first service request; and sending the first service result to the client and a second server possessing a second service function, for the second server to directly generate a second service result based on the first service result, and after the second server receives a second service request generated by the client based on the first service result, to send the generated second service result to the client.

In some embodiments, first service request comprises an order placement request; and the first service result comprises order information.

In some embodiments, the device comprises an order placement server, and the second server comprises a payment server.

In some embodiments, the second server is caused to receive the first service result from the service processing device to generate the second service result, before the second server receives the second service request from the client.

According to another aspect of the disclosure, a service processing device (e.g., a second server) comprises a processor and a non-transitory computer-readable storage medium storing instructions that, when executed by the processor, cause the device to perform a service processing method. The method comprises: receiving a first service result sent by a first server possessing a first service function, wherein the first service result is generated after processing by the first server a first service request sent by a client; and generating a second service result based on the first service result.

In some embodiments, the method further comprises: receiving a second service request sent by the client; and after receiving the second service request, feeding the generated second service result back to the client.

In some embodiments, the first service result comprises order information; the second service result comprises a payment page including order information; and the second service request comprises a payment request.

In some embodiments, the device is configured to receive the first service result from the first server to generate the second service result, before the device receives the second service request from the client.

In some embodiments, the device comprises a payment server, and the first server comprises an order placement server.

In some embodiments, the method further comprises: rendering and building a service interface based on the second service result; and after receiving the second service request sent by the client, sending the rendered and built service interface to the client for display.

A service processing device provided by the embodiments of this disclosure comprises: a receiving module, configured to receive a first service request sent by a client; a processing module, configured to generate a first service result based on the first service request; and a sending module, configured to send the first service result to the client and a second server possessing a second service function, for the second server to directly generate a second service result based on the first service result, and after the second server receives a second service request generated by the client based on the first service result, to send the generated second service result to the client.

Another service processing device provided by the embodiments of this disclosure comprises: a receiving module, configured to receive a first service result sent by a first server possessing a first service function, wherein the first service result is generated after processing by the first server a first service request sent by a client; and a processing module, configured to generate a second service result based on the first service result.

Another service processing device provided by the embodiments of this disclosure comprises: a receiving module, configured to receive a first service result sent by a first server possessing a first service function, wherein the first service result is generated after processing by the first server a first service request sent by the client; a generation module, configured to generate a second service result based on the first service result; a rendering module, configured to render and build a service interface based on the second service result; and a feedback module, configured to send the rendered and built service interface to the client for display after the receiving module receives a second service request sent by the client.

The embodiments of this disclosure provide a service processing method and device. Through this method, after the first server receives the first service request issued by the client, the first service request is processed and a corresponding first service result is generated. At this time, in addition to returning the first service result to the client, the first server may send this first service result to a second server in accordance with the service flow. In this way, the second server can promptly process the first service result and go on to generate a second service result. Employing this approach, the second server can generate a second service result prior to receiving a second service request from the client. After the second server receives a second request sent by the client, it can directly return the already generated second service result to the client. Compared to current technologies, the second server can generate a second service result in advance based on the first service result and before receiving the client's second service request, thus effectively reducing the client's wait time and boosting the time-effectiveness of service request processing.

BRIEF DESCRIPTION OF THE DRAWINGS

The drawings described herein are for further understanding this disclosure, and are a part of this disclosure. The exemplary embodiments of this disclosure and the descriptions thereof are for explaining this disclosure, and they do not constitute an improper limitation of this disclosure. In the drawings.

DETAILED DESCRIPTION

In order to clarify the objectives, technical schemes, and advantages of this disclosure, in conjunction with the detailed embodiments and corresponding drawings of this disclosure, a clear, comprehensive description of the technical schemes of this disclosure is given below. The described embodiments are merely a portion of the embodiments of this disclosure and are not the full complement of embodiments. Based on the embodiments of this disclosure, and making no expenditure of creative labor, all other embodiments obtained by a person having ordinary skill in the art shall fall within the scope of protection of this disclosure.

As stated previously, when a user uses a client to obtain a service from an online system requiring multiple service systems for completion, the client generally needs to receive intermediate service results returned by different service systems. After redirection based on the intermediate service result, a request is issued to the next service system, until the entire service flow has been completed. However, in this process, when the client sends a request to a service system, the effects of the network environment are likely to come into play, producing transmission delays, and the service system can only conduct processing after receiving the service request issued by the client. Under heavy service system workloads, a processing delay may be generated when the service system is processing this service request. In this way, the client is subject to the dual influence of transmission delays and processing delays, resulting in long client wait times. Clearly, this will have a serious influence on the time-effectiveness of service requests.

Figure 1:
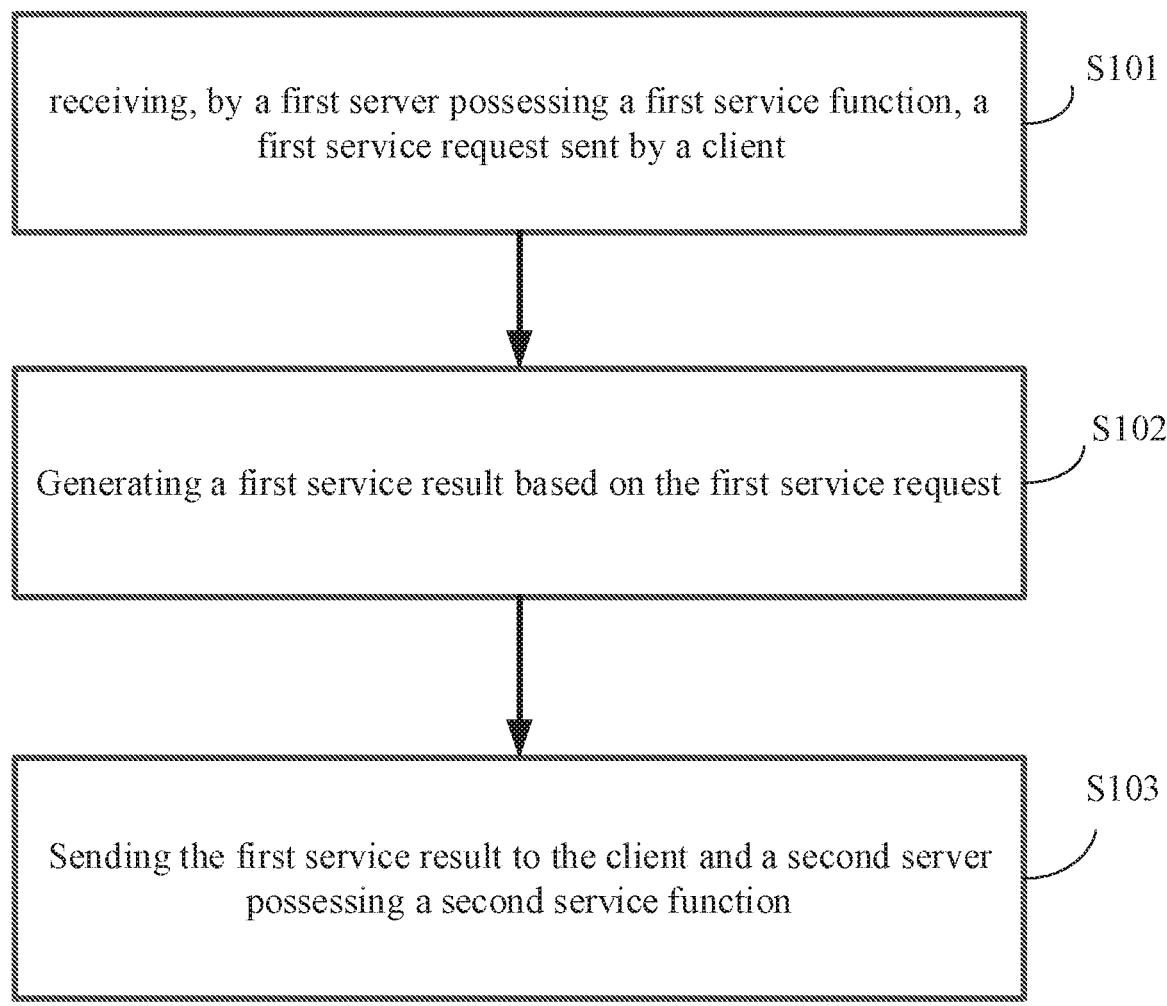
FIG. 1 is a service processing process based on a first server side provided by the embodiments of this disclosure.

As such, a service processing mode that can reduce client wait times is needed, i.e., the embodiments of this disclosure provide a service processing method, as shown in FIG. 1. The service may include, for example, a transaction service.

In the embodiments of this disclosure, because the services available to a user through a client from within an online system often require multiple service systems for completion, the client may initiate different service requests targeting different service systems, in accordance with the service flow. However, the different service requests initiated by the client can be deemed as to complete the same service.

In addition, the first server and second server mentioned in the following of this disclosure can be servers of two adjacent services in the service flow. For example, it is assumed there are three service servers—A, B, and C—and completing a service requires an order of service server A to service server B to service server C. For service servers A and B, the first server can be service server A, and the second server can be service server B. For service servers B and C, the first server can be service server B, and the second server can be service server C. In other words, the first server and second server in this disclosure are not limited to scenarios with two servers.

A description of the service processing method of this disclosure is given below. For example, the service processing process shown in FIG. 1 comprises the following steps:

Step S101, receiving, by a first server possessing a first service function, a first service request sent by a client.

In application scenarios, when a user uses a client to obtain a service, usually a service request must be issued to the corresponding service server within the online system. For example, a user uses a client to perform an order placement operation for a given product. At this time, the client may send an order placement request to an order placement server. In this example, the order placement server is the first server, and the order placement request is the first service request.

In some embodiments, the first server can be any backend service server of the online system. The first service request can be the service request received by the first server. This first service request can be a service request issued by the client based on the user's operation instructions, or a service request issued after the client receives an intermediate service result fed back by the previous service server in the service flow. Of course, this does not constitute a limitation of this disclosure.

The client can be a browser or application running in a terminal, etc.

Step S102, generating a first service result based on the first service request.

After the first server receives the first service request, the first server may perform processing for this first service request, thereby generating a corresponding service result, i.e., a first service result. Here, the first service result is for example an intermediate service result.

Of course, in one mode of the embodiments of this disclosure, the first service request may carry the client's identifying information, so the first service result generated by the first server may also include the client's identifying information.

Step S103, sending the first service result to the client and a second server possessing a second service function, for the second server to directly generate a second service result based on the first service result, and after the second server receives a second service request generated by the client based on the first service result, to send the generated second service result to the client.

The second server can be a service server after the first server in the processing sequence of the service flow. Therefore, after the first server sends the first service result to the client, the client may redirect to the second server based on this first service result, in order to issue an intermediate service request (i.e., a second service request) to the second server.

For actual applications, the process of the client sending a second service request to the second server may encounter delays due to the influence of the network environment. When the second server receives the second service request and conducts processing, there may also be processing delays. These two types of situations may create long wait times for the client. Therefore, to reduce the client's wait time, in the embodiments of this disclosure, in addition to sending the first service result to the client, the first server directly sends this first service result to the second server, enabling the second server to generate a second service result based on the first service result.

As one mode of the embodiments of this disclosure, when the first server sends the first service result to the second server, a corresponding request can be generated, and the first service result can be carried within this request, using a "simulated" client to cause the second server to generate a corresponding second service result based on the first service result carried within the request.

In some embodiments, the first server and second server are both backend service servers of the online system. During transmission, they use the online system's internal network, which ensures that transmission between the first server and second server will not be affected by the network environment, and no network delay will be resulted in. In other words, after the first server sends a first service result to the second server, the second server may immediately receive this first service result, so it can process the first service result. Even when the second service server's processing load is heavy, by employing this approach, it is possible to save the time spent when the client sends a second request to the second server.

The preceding content of the embodiments of this disclosure is not limited to application in scenarios with two servers. In actual applications, multiple service servers working together to complete a given service may follow this approach. After generating a corresponding intermediate service result, in addition to sending this intermediate service result to the client, the intermediate service result is sent to the next service system, in accordance with the processing sequence of the service flow, causing the next service system to process the intermediate service result in advance and generate a subsequent intermediate service result, continuing in this way until the entire service flow has been completed.

Through these steps, after the first server receives the first service request issued by the client, this first service request is processed and a corresponding first service result is generated. At this time, in addition to returning the first service result to the client, the first server may send this first service result to a second server in accordance with the service flow. In this way, the second server can promptly process the first service result and go on to generate a second service result. That is, the second server is configured or caused to receive the first service result from the first server to generate the second service result, before the second server receives the second service request from the client. Employing this approach, the second server can generate a second service result prior to receiving a second service request from the client. After the second server receives a second request sent by the client, the second server can directly return the already generated second service result to the client. Compared to the approach of current technologies, the second server can generate a second service result in advance based on the first service result and before receiving the client's second service request, thus effectively reducing the client's wait time and boosting the time-effectiveness of service request processing.

In order to clearly set forth the abovementioned service processing method of this disclosure, an actual payment service scenario is used to give a detailed description:

It is assumed that a given user employs the client of a given product website and purchases a product on this product website. The operation of the user purchasing the product through the client can be viewed as involving two services: order placement and payment (i.e., which need this website's backend order placement server and payment server to jointly complete). Therefore, in this scenario, the first service request may comprise an order placement request, the first server comprises an order placement server, the first service result comprises order information, and the second server comprises a payment server.

In this scenario, in Step S101, the receiving by the first server a first service request sent by a client comprises: receiving, by the order placement server, the order placement request sent by the client.

In Step S102, the generating a first service result based on the first service request comprises: generating the order information based on the order placement. In one mode of the embodiments of this disclosure, the order information can comprise: account information, product information, amount information, etc.

In Step S103, the sending the first service result to the client and a second server associated with the service request comprises: sending the order information to the client and the payment server associated with the order placement request. Here, the payment server associated with the order placement request can be ascertained based on a pre-defined service flow.

Figure 2:
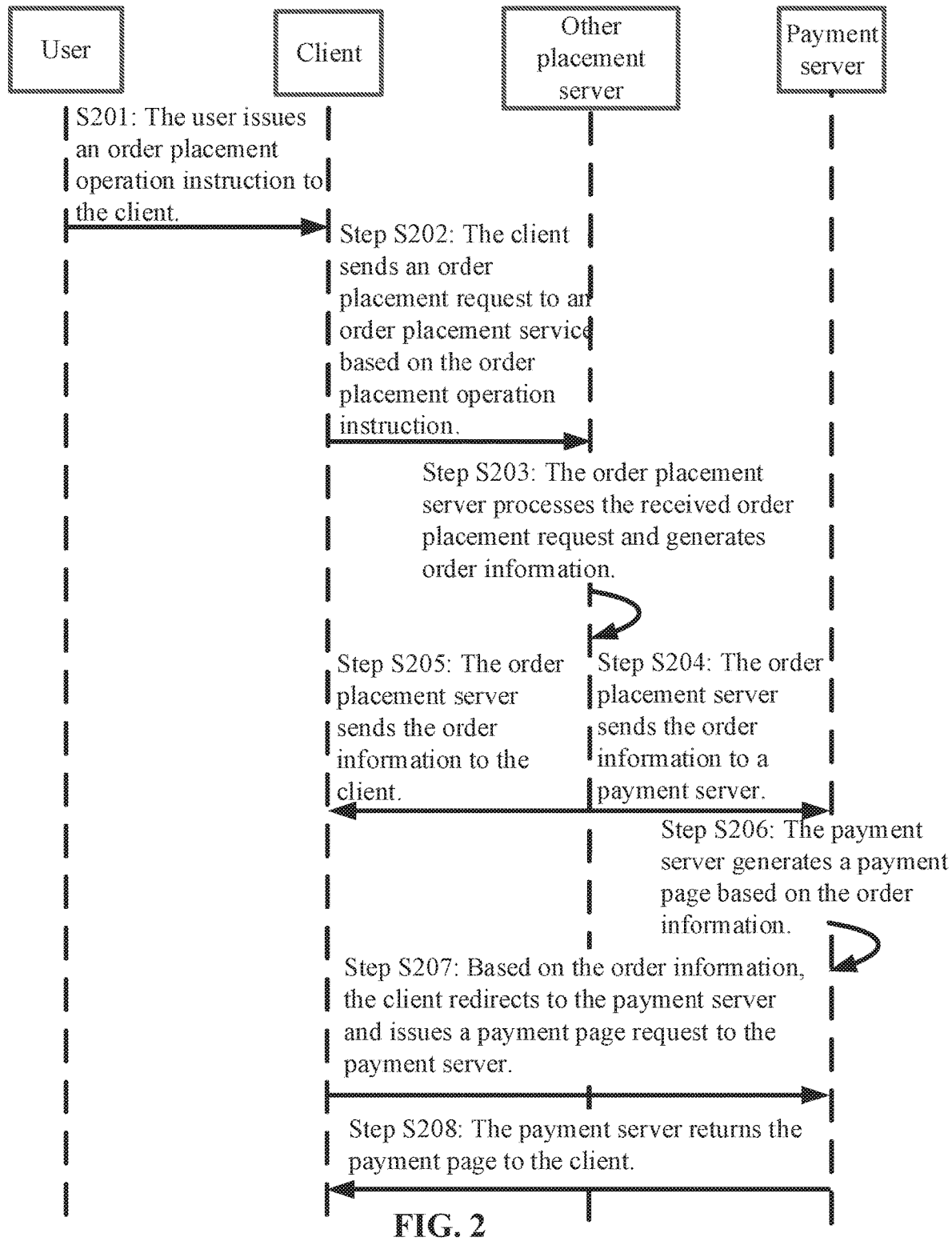
FIG. 2 is a schematic diagram of a service processing process of an application provided by the embodiments of this disclosure.

In the application shown in FIG. 2, the service flow for this scenario is illustrated:

Step S201: The user issues an order placement operation instruction to the client.

Step S202: The client sends an order placement request to an order placement service based on the order placement operation instruction.

Step S203: The order placement server processes the received order placement request and generates order information.

Step S204: The order placement server sends the order information to a payment server, causing the payment server to execute Step S206.

Step S205: The order placement server sends the order information to the client, causing the client to execute Step S207.

Step S206: The payment server generates a payment page based on the order information.

Step S207: Based on the order information, the client redirects to the payment server and issues a payment page request to the payment server.

Step S208: The payment server returns the payment page to the client.

As shown by preceding contents and examples, in an actual payment scenario, after an order server generates order information, the order information may be immediately sent to the payment server for processing to generate a corresponding payment page. Therefore, after the client issues a payment page request to the payment server, the payment server can immediately return a generated payment page to the client. This mode may effectively reduce the client's wait time for payment page generation; furthermore, it enables the user to more rapidly navigate to the payment page, and to carry out the payment service in the payment page.

The preceding content is a service processing process based on the first server side. This disclosure also provides a service processing method for a second server, as shown in FIG. 3a.

Figure 3A:
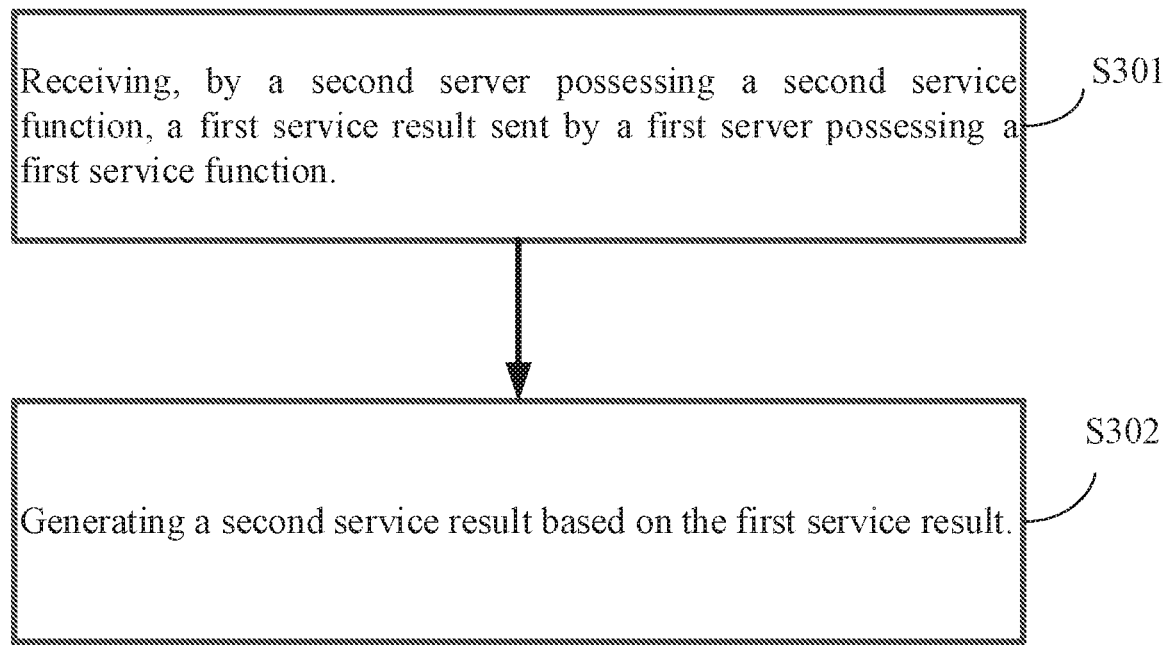
FIG. 3a is a service processing process based on a second server side provided by the embodiments of this disclosure.

The service processing method shown in FIG. 3a comprises the following steps:

Step S301: receiving, by a second server possessing a second service function, a first service result sent by a first server possessing a first service function.

Here, the first service result is generated after the first server processes the first service request sent by the client.

Like the previous method, the first server and second server are service servers with different service functions in the backend of the online system.

Step S302: generating a second service result based on the first service result.

The first service result is an intermediate service result, separately sent by the first server to the client and second server, then the second server processes this first service result and the second server's processing result (i.e., the second service result) is generated. The detailed process is as previously described; further details will not be given here.

Unlike the current technologies, the second server in the embodiments of this disclosure does not need to wait for a service request sent by the client (i.e., the previously described second service request). Rather, the second server receives a first service result sent by the first server and generates a second service result based on the first service result (e.g., in the previously described example, the payment server generates a payment interface including order information based on the order information). Thus, it is possible to directly feed a generated second service result back to the client immediately upon receiving a second service request sent by the client, reducing client wait times.

On this basis, the method shown in FIG. 3a can also comprise: receiving, by the second server, a second service request sent by the client, and after receiving the second service request, feeding the generated second service result back to the client.

In one mode of the embodiments of this disclosure, the second service request typically includes the client's identifying information. Therefore, based on the identifying information, the second server can ascertain the second service result matching this second service request.

Similarly, in an actual payment scenario, the second server can be a payment server, the first server can be an order placement server, the first service result can be order information, the second service result can be a payment page including order information, and the second service request can be a payment request.

Therefore, in the previously described steps, the receiving, by a second server, a first service result sent by a first server comprises: receiving, by a payment server, the order information sent by an order placement server.

The generating a second service result based on the first service result comprises: generating the payment page including the order information based on the order information.

The feeding the generated second service result back to the client after receiving the second service request comprises: feeding a generated payment page back to the client after receiving the payment request.

The detailed application scenario is as shown in FIG. 2.

On the basis of the previously described service processing method shown in FIG. 3a, the second service result generated by the second server based on the first service result usually appears as a service interface. After the client issues a subsequent service request to the second server, this service interface will be displayed in the client, so the user can use this service interface to perform operations related to service confirmation. Like the previously described example, after the payment server (i.e., second server) receives order information (i.e., the first service result) sent by the order placement server (i.e., first server), corresponding payment information (i.e., a second service result) is generated based on this order information, and a corresponding payment page is rendered and built based on the payment information. If the client issues a payment request to this payment server, the payment server can send this payment page to the client, enabling the user to directly find out information such as the purchased product, the required amount, and the like through this payment page, and perform payment confirmation operations.

Figure 3B:
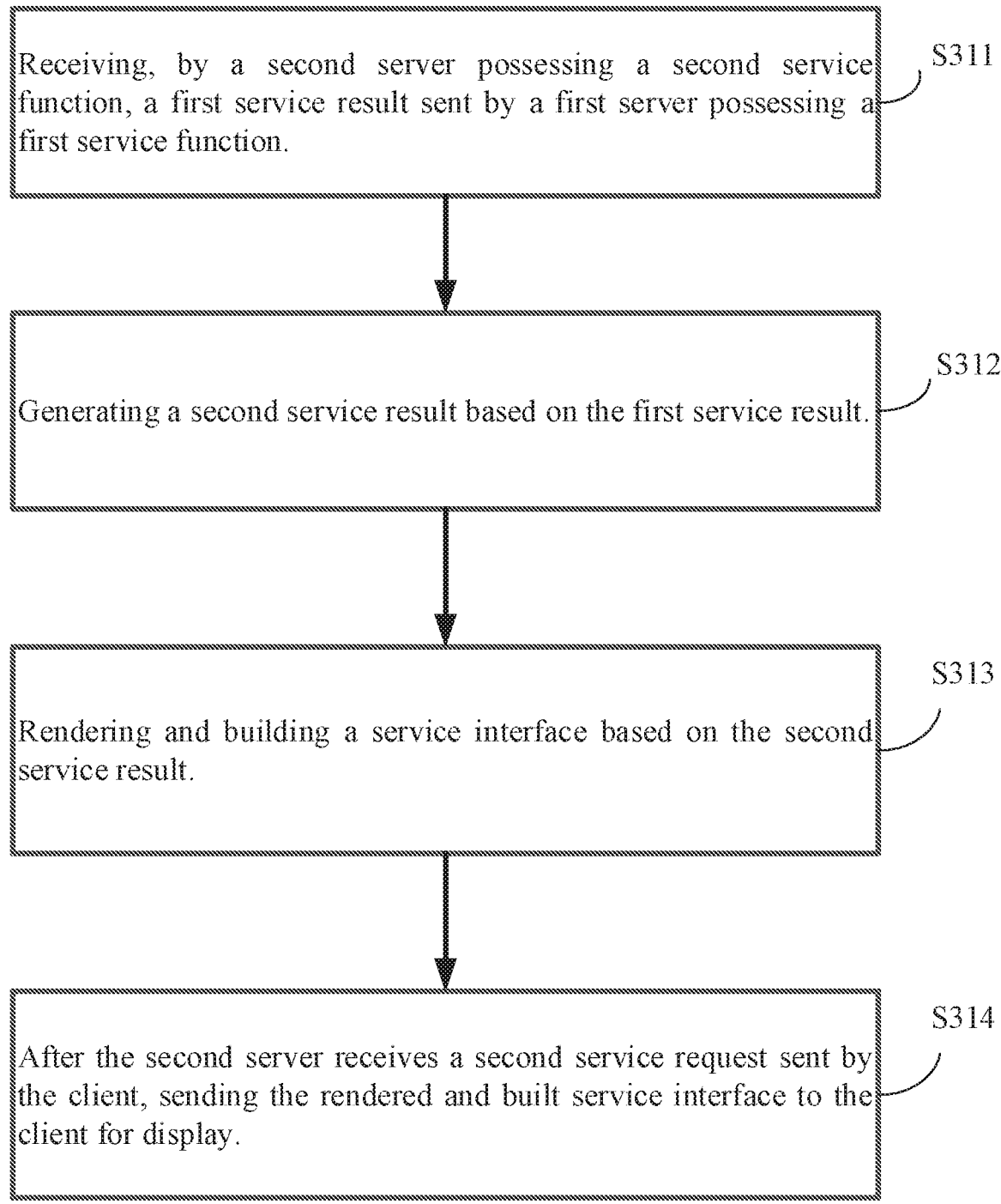
FIG. 3b is another service processing process based on a second server side provided by the embodiments of this disclosure.

Based on this, the embodiments of this disclosure also provide a service processing method as shown in FIG. 3b. This method comprises the following steps:

Step S311: receiving, by a second server possessing a second service function, a first service result sent by a first server possessing a first service function.

Here, the first service result is generated after processing by the first server targeting the first service request sent by the client.

Step S312: Generating a second service result based on the first service result.

Step S313: Rendering and building a service interface based on the second service result.

In the embodiments of this disclosure, the second server can perform rendering of the second service result based on a pre-defined interface template, thereby building a service interface.

Step S314: After the second server receives a second service request sent by the client, sending the rendered and built service interface to the client for display.

The detailed execution process and application scenario of the method shown in FIG. 3b is the same as previously described.

Figure 4:
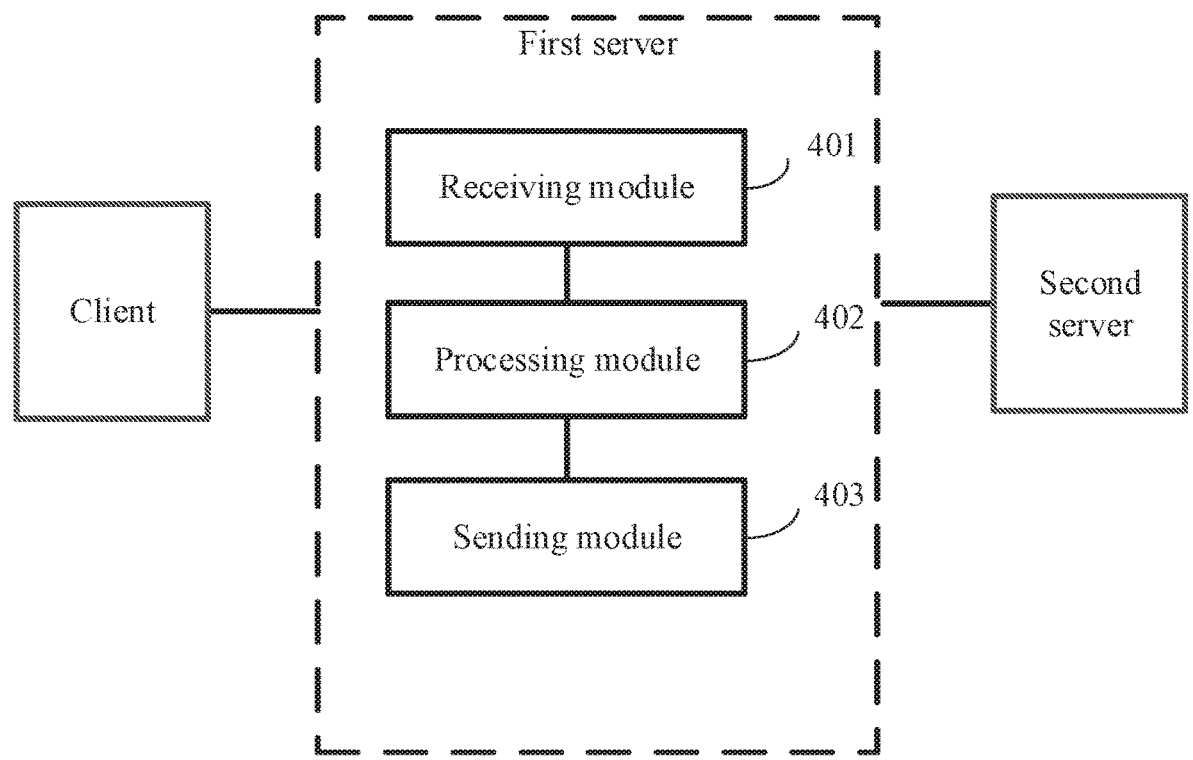
FIG. 4 is a structural schematic diagram of a service processing device based on a first server side provided by the embodiments of this disclosure.

The preceding provides several embodiments of the service processing method of this disclosure. This disclosure also provides an embodiment of a service processing device, as shown in FIG. 4. For the service processing device in FIG. 4, the device can be set up in the first server. This device comprises: a receiving module 401, configured to receive a first service request sent by a client; a processing module 402, configured to generate a first service result based on the first service request; and a sending module 403, configured to send the first service result to the client and a second server possessing a second service function, for the second server to directly generate a second service result based on the first service result, and after the second server receives a second service request generated by the client based on the first service result, to send the generated second service result to the client.

In one scenario in the embodiments of this disclosure, the first server can be an order placement server, the first service request can comprise an order placement request, the first service result can comprise order information, and the second server can comprise a payment server.

Based on this, the receiving module 401 is configured to receive an order placement request sent by the client; the processing module 402 is configured to generate order information based on the order placement; and the sending module 403 is configured to send the order information to the client and the payment server associated with the order placement request.

In some embodiments, the various modules and units of the first server may be implemented as software instructions (or a combination of software and hardware). The first server may be referred to as a service processing device or system. That is, the first server described with reference to FIG. 4 may comprise a processor and a non-transitory computer-readable storage medium storing instructions that, when executed by the processor, cause one or more components (e.g., the processor) of the first server to perform various steps and methods of the modules and units described above.

Figure 5:
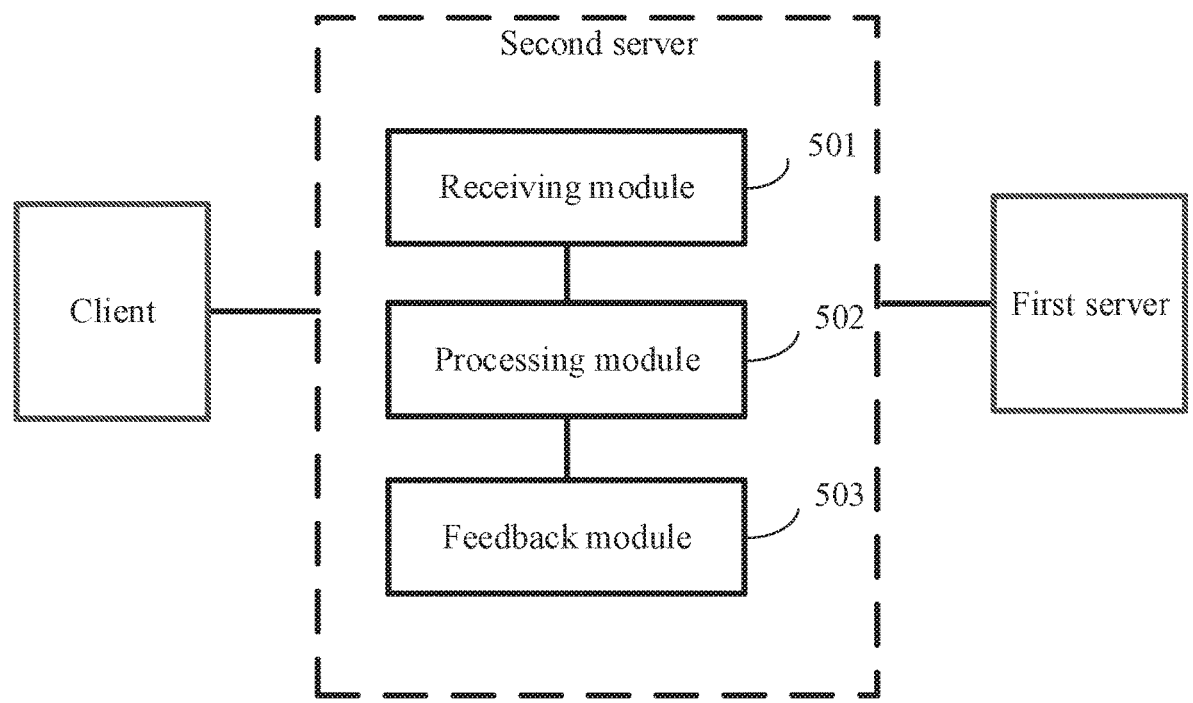
FIG. 5 is a structural schematic diagram of a service processing device based on a second server side provided by the embodiments of this disclosure

On the second server side, this disclosure also provides a service processing device as shown in FIG. 5. This device can be set up in the second server, and it comprises: a receiving module 501 configured to receive a first service result sent by a first server possessing a first service function, wherein the first service result is generated after processing by the first server the first service request sent by the client; and a processing module 502 configured to generate a second service result based on the first service result.

In one mode of the embodiments of this disclosure, the receiving module 501 is also configured to receive a second service request sent by the client. Based on this, this device may also comprise: a feedback module 503 configured to feed a generated second service result back to the client after the receiving module receives the second service request.

In one scenario in the embodiments of this disclosure, the first server may comprise an order placement server, the second server can comprise a payment server, the first service result may comprise order information, the second service result may comprise a payment page including order information, and the second service request may comprise a payment request.

Based on this, the receiving module 501 is configured to receive order information send by the order placement server.

The processing module 502 is configured to generate the payment page including the order information based on the order information.

The feedback module 503 is configured to feed a generated payment page back to the client after the receiving module receives the payment request.

In some embodiments, the various modules and units of the second server may be implemented as software instructions (or a combination of software and hardware). The second server may be referred to as a service processing device or system. That is, the second server described with reference to FIG. 5 may comprise a processor and a non-transitory computer-readable storage medium storing instructions that, when executed by the processor, cause one or more components (e.g., the processor) of the second server to perform various steps and methods of the modules and units described above.

Figure 6:
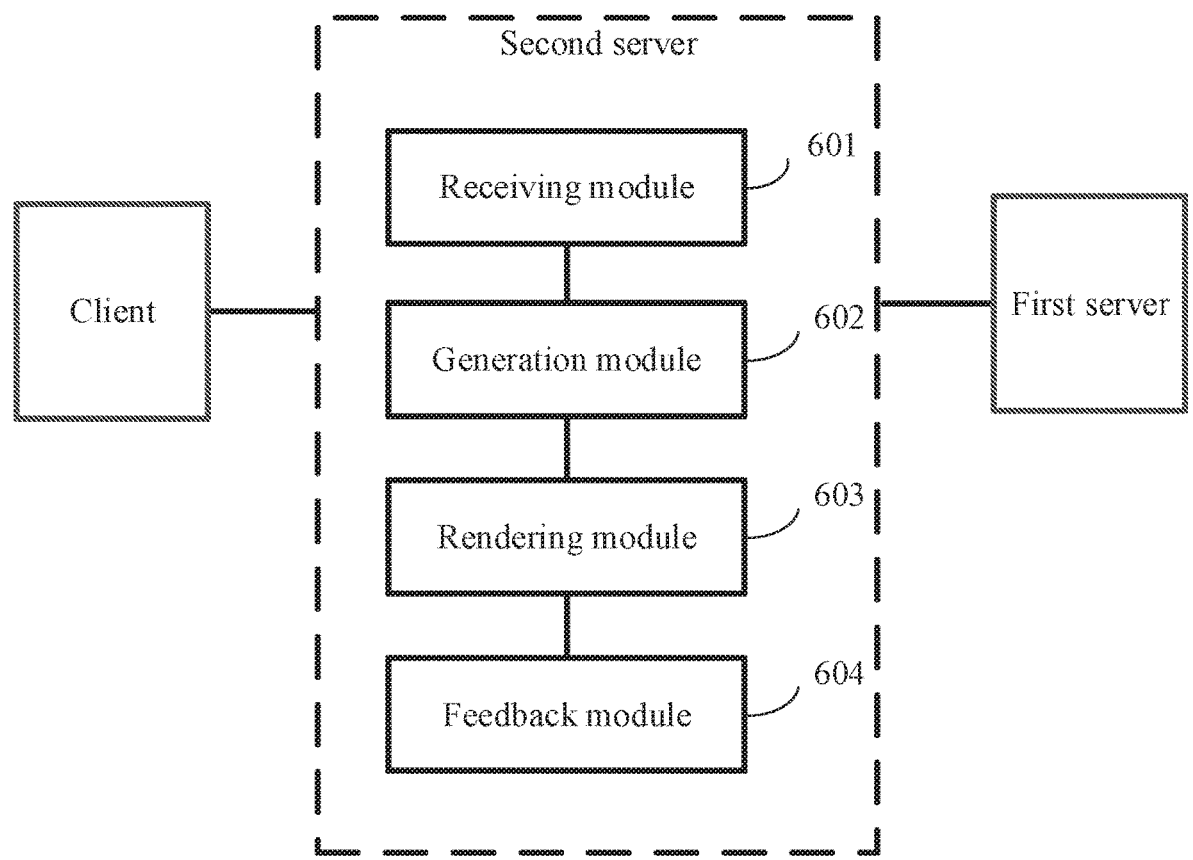
FIG. 6 is a structural schematic diagram of another service processing device based on a second server side provided by the embodiments of this disclosure.

This disclosure also provides a service processing device as shown in FIG. 6. This device can be set up in the second server, comprising: a receiving module 601 configured to receive a first service result send by a first server possessing a first service function, wherein the first service result is generated after processing by the first server a first service request sent by a client; a generation module 602 configured to generate a second service result based on the first service result; a rendering module 603 configured to render and build a service interface based on the second service result; and a feedback module 604 configured to send the rendered and built service interface to the client for display after the receiving module receives a second service request sent by the client.

In some embodiments, the various modules and units of the second server may be implemented as software instructions (or a combination of software and hardware). The second server may be referred to as a service processing device or system. That is, the second server described with reference to FIG. 6 may comprise a processor and a non-transitory computer-readable storage medium storing instructions that, when executed by the processor, cause one or more components (e.g., the processor) of the second server to perform various steps and methods of the modules and units described above.

A person skilled in the art should understand that the embodiments of this disclosure can be provided as methods, systems, or computer program products. Therefore, this disclosure may employ a purely hardware embodiment form, purely software embodiment form, or an embodiment form that combines software and hardware. Also, this disclosure may employ the form of computer program products achieved through one or more computer storage media (including but not limited to magnetic disc memory, CD-ROM, and optical memory) comprising computer-executable program code.

This disclosure is described by referencing flow diagrams and/or block diagrams based on the methods, equipment (systems), and computer program products of the embodiments of this disclosure. Computer program instructions can be used to achieve every flow and/or block in the flow diagrams and/or block diagrams, as well as combinations of flows and/or blocks in the flow diagrams and/or block diagrams. These computer program instructions can be provided to the processor of a general-purpose computer, special-purpose computer, embedded processing machine, or other programmable data processing device to generate a machine, causing the instructions executed by the processor of a computer or other programmable data processing device to generated a device to achieve the specified functions of one or more flows in a flow diagram and/or one or more blocks in a block diagram.

These computer program instructions can also be stored in computer-readable memory that can cause a computer or other programmable data processing device to operate in a given mode, causing the instructions stored in this computer-readable memory to generate a product comprising an instruction apparatus. This instruction apparatus achieves the functions specified in one or more flows of a flow chart and/or one ore more blocks of a block diagram.

These computer program instructions can also be loaded onto a computer or other programmable data processing device, enabling the execution of a series of operation steps on the computer or other programmable device to produce computer processing. Thus, the instructions executed on the computer or other programmable device provide steps for achieving the specified functions of one or more flows in a flow chart and/or one or more blocks in a block diagram.

In one typical configuration, the computation equipment comprises one or more processors (CPUs), input/output interfaces, network interfaces, and internal memory.

The internal memory may comprise the forms of volatile memory on computer-readable media, random access memory (RAM), and/or non-volatile RAM, such as read-only memory (ROM) or flash RAM. Internal memory is an example of computer-readable media.

Computer-readable media include permanent, nonpermanent, mobile, and immobile media, which can achieve information storage through any method or technology. The information may be computer-readable instructions, data structures, program modules, or other data. Examples of computer storage media include, but are not limited to, Phase-change RAM (PRAM), Static RAM (SRAM), Dynamic RAM (DRAM), other types of Random Access Memory (RAM), Read-Only Memory (ROM), Electrically Erasable Programmable Read-Only Memory (EEPROM), flash memory or other internal memory technologies, Compact Disk Read-Only Memory (CD-ROM), Digital Versatile Discs (DVD) or other optical memories, cassettes, magnetic tape and disk memories or other magnetic memory devices, or any other non-transmission media, which can be used for storing information that can be accessed by a computation device. According to the definitions herein, computer-readable media exclude transitory computer-readable media (transitory media), such as modulated data signals and carriers.

The terms "comprise" and "include" or any variations thereof are intended as non-exclusive inclusion. Thus, a process, method, product, or device comprising a series of elements does not comprise these elements only. It also comprises other elements not explicitly listed, or it also comprises elements inherent to that process, method, product, or device. When there are no other limitations, an element defined by the phrasing "comprising one . . . " does not exclude the presence of other, similar elements in the process, method, product, or device comprising the element.

A person skilled in the art should understand that the embodiments of this disclosure can be provided as methods, systems, or computer program products. Therefore, each embodiment may employ a purely hardware embodiment form, purely software embodiment form, or an embodiment form that combines software and hardware. Also, each embodiment may employ the form of computer program products achieved through one or more computer storage media (including but not limited to magnetic disc memory, CD-ROM, and optical memory) comprising computer-executable program code.

Described above are merely embodiments of this disclosure. They are not used to limit this disclosure. For persons skilled in the art, this disclosure may be modified or changed. All revisions, equivalent substitutions, and improvements made within the spirit and principles of this disclosure shall fall within the scope of the claims of this disclosure.

The invention claimed is:

1. A service processing method, comprising:
   receiving, by a first server possessing a first service function, a first service request sent by a user terminal over a computer network;
   generating, by the first server based on the first service request, a first service result according to the first service function;
   sending, by the first server, the first service result in parallel to the user terminal and a second server possessing a second service function over the computer network;
   receiving, by the second server, the first service result from the first server;
   generating, by the second server based on the first service result, a second service result including a payment page according to the second service function;
   receiving, by the user terminal, the first service result from the first server;
   generating, by the user terminal, a second service request based on the first service result;
   sending, by the user terminal, the second service request to the second server to request the second service result including the payment page; and
   in response to receiving the second service request, sending, by the second server, the generated second service result including the payment page over the computer network to the user terminal,
   wherein the second server generates the second service result including the payment page before the second server receives, from the user terminal, the second service request for the second service result including the payment page and after the first server sends the first service result to the user terminal.

2. The method according to claim 1, wherein: the first service request comprises an order placement request; and the first service result comprises order information.

3. The method according to claim 2, wherein: the first server comprises an order placement server, and the second server comprises a payment server.

4. A service processing method, comprising:
   receiving, over a computer network by a second server possessing a second service function, a first service result sent by a first server possessing a first service function, wherein the first service result is generated after processing by the first server a first service request sent by a user terminal, and wherein the first service result is sent by the first server in parallel to the user terminal and the second server;
   generating, by the second server, a second service result including a payment page based on the first service result without receiving a request for the second service result including the payment page;
   receiving, by the second server from the user terminal over the computer network, a second service request for the second service result including the payment page, wherein the second service request is generated by the user terminal based on the first service result sent by the first server to the user terminal; and
   in response to receiving the second server request from the user terminal, transmitting, by the second server, the generated second service result including the payment page over the computer network to the user terminal;
   wherein the second server generates the second service result including the payment page before the second server receives, from the user terminal, the second service request for the second service result including the payment page and after the first server sends the first service result to the user terminal.

5. The method according to claim 4, wherein: the first service result comprises order information; the second service result comprises the payment page including the order information; and the second service request comprises a payment request.

6. The method according to claim 4, wherein: the first server comprises an order placement server, and the second server comprises a payment server.

7. A service processing device, comprising a processor and a non-transitory computer-readable storage medium storing instructions that, when executed by the processor, cause the processor to perform operations comprising:
   receiving a first service request sent by a user terminal over a computer network;
   generating a first service result based on the first service request; and
   sending the first service result in parallel to the user terminal and a second server possessing a second service function over the computer network, for the second server to directly generate a second service result including a payment page based on the first service result without receiving a request for the second service result including the payment page, and after the second server receives a second service request generated by the user terminal based on the first service result, to send the generated second service result including the payment page over the computer network to the user terminal,
   wherein the second server generates the second service result including the payment page before the second server receives, from the user terminal, the second service request for the second service result including the payment page and after the first server sends the first service result to the user terminal.

8. The device according to claim 7, wherein: the first service request comprises an order placement request; and the first service result comprises order information.

9. The device according to claim 8, comprising an order placement server, wherein the second server comprises a payment server.

10. A service processing device, comprising a processor and a non-transitory computer-readable storage medium storing instructions that, when executed by the processor, cause the processor to perform operations comprising:
    receiving, over a computer network, a first service result sent by a first server possessing a first service function, wherein the first service result is generated after processing by the first server a first service request sent by a user terminal, and wherein the first service result is sent by the first server in parallel to the user terminal and the second server;

generating a second service result including a payment page based on the first service result without receiving a request for the second service result including the payment page;

receiving, from the user terminal over the computer network, a second service request for the second service result including the payment page, wherein the second service request is generated by the user terminal based on the first service result sent by the first server to the user terminal; and in response to receiving the second server request from the user terminal, transmitting the generated second service result including the payment page over the computer network to the user terminal, wherein the processor generates the second service result including the payment page before the processor receives, from the user terminal, the second service request for the second service result including the payment page and after the first server sends the first service result to the user terminal.

11. The device according to claim 10, wherein: the first service result comprises order information; the second service result comprises the payment page including the order information; and the second service request comprises a payment request.

12. The device according to claim 10, comprising a payment server, wherein the first server comprises an order placement server.

* * * * *